: # (12) United States Patent
Hood et al.

(10) Patent No.: US 7,650,405 B2
(45) Date of Patent: Jan. 19, 2010

(54) TRACKING AND TRACING ACROSS PROCESS BOUNDARIES IN AN INDUSTRIAL AUTOMATION ENVIRONMENT

(75) Inventors: Gavan W. Hood, Upper Lockyer (AU); Ralph Kappelhoff, Milwaukee, WI (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 415 days.

(21) Appl. No.: 11/238,606

(22) Filed: Sep. 29, 2005

(65) Prior Publication Data

US 2006/0259634 A1 Nov. 16, 2006

Related U.S. Application Data

(60) Provisional application No. 60/680,682, filed on May 13, 2005.

(51) Int. Cl.
*G06F 15/173* (2006.01)

(52) U.S. Cl. .................. 709/224; 709/217; 709/223; 709/225

(58) Field of Classification Search .......... 709/217, 709/223, 224, 225
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,282,244 A | 1/1994 | Fuller et al. |
| 5,301,320 A | 4/1994 | McAtee et al. |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |

(Continued)

OTHER PUBLICATIONS

Pitzek et al., Configuration and Management of a Real-Time Smart Transducer Network, 2003 IEEE, 2003, 4 pages.

(Continued)

*Primary Examiner*—Liangche A Wang
(74) *Attorney, Agent, or Firm*—Turocy & Watson LLP; William R. Walburn

(57) ABSTRACT

A system that facilitates tracking and tracing products in an industrial environment comprises a reception component that receives data indicative of location of entities within an industrial environment, wherein the data conforms to a hierarchically structured data model. A monitoring component facilitates tracking and tracing the entities across process boundaries. Tracking refers to a process of uniformly building a track of objects that are forwarded to, processed for, applied in, or disposed of usage. Similarly, tracing is the process of uniformly generating a sample of traces of objects that are forwarded to, processed for, applied in, or disposed of usage.

26 Claims, 17 Drawing Sheets

U.S. PATENT DOCUMENTS

| | | |
|---|---|---|
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sondregger |
| 5,790,935 A | 8/1998 | Payton |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,970,494 A | 10/1999 | Velissaropoulos et al. |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,061,740 A | 5/2000 | Ferguson et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,477,435 B1 | 11/2002 | Ryan et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,615,091 B1 | 9/2003 | Birchenough et al. |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,768,987 B1 | 7/2004 | Couch et al. |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 | 12/2004 | Frank et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung, ct al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,031,782 B2 * | 4/2006 | Kappelhoff et al. ........... 700/95 |
| 7,146,355 B2 | 12/2006 | Chu-Carroll |
| 7,162,312 B2 | 1/2007 | Gross et al. |
| 7,171,476 B2 * | 1/2007 | Maeda et al. ............... 709/227 |
| 7,225,193 B2 | 5/2007 | Mets et al. |
| 7,251,193 B2 * | 7/2007 | Jung ...................... 365/233.5 |
| 7,251,222 B2 * | 7/2007 | Chen et al. ................... 370/256 |
| 7,308,454 B2 | 12/2007 | Abineri et al. |
| 2002/0007286 A1 | 1/2002 | Okamoto |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0131404 A1 | 9/2002 | Mehta et al. |
| 2002/0161827 A1 | 10/2002 | Brault |
| 2002/0188366 A1 | 12/2002 | Pepper et al. |
| 2002/0194577 A1 | 12/2002 | Connor et al. |
| 2003/0014387 A1 | 1/2003 | Kreidler et al. |
| 2003/0036876 A1 | 2/2003 | Fuller et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |

| | | |
|---|---|---|
| 2003/0172145 A1 | 9/2003 | Nguyen |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0098269 A1 | 5/2004 | Wise et al. |
| 2004/0117624 A1 | 6/2004 | Brandt et al. |
| 2004/0153171 A1 | 8/2004 | Brandt et al. |
| 2004/0167790 A1 | 8/2004 | Grasse |
| 2004/0193449 A1* | 9/2004 | Wildman et al. ............... 705/2 |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2004/0268186 A1 | 12/2004 | Maturana et al. |
| 2005/0005289 A1 | 1/2005 | Adolph et al. |
| 2005/0015397 A1 | 1/2005 | Abineri et al. |
| 2005/0044112 A1 | 2/2005 | Yamamoto et al. |
| 2005/0065626 A1* | 3/2005 | Kappelhoff et al. ........... 700/97 |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0193118 A1* | 9/2005 | Le et al. .................... 709/227 |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0064428 A1 | 3/2006 | Colaco et al. |
| 2006/0173895 A1 | 8/2006 | Engquist et al. |
| 2006/0195817 A1 | 8/2006 | Moon |
| 2006/0212855 A1 | 9/2006 | Bournas et al. |
| 2007/0268922 A1 | 11/2007 | Dougan et al. |

OTHER PUBLICATIONS

European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
OA dated Oct. 28, 2008 for U.S. Appl. No. 11/240,335, 15 pages.
ISR mailed Jun. 19, 2008 for PCT Application No. PCT/ US06/ 18350, 2 pages.
OA dated Apr. 15, 2009 for U.S. Appl. No. 11/240,335, 10 pages.
OA dated May 15, 2008 for U.S. Appl. No. 11/240,335, 31 pages.
OA dated Oct. 8, 2008 for U.S. Appl. No. 11/238,607, 32 pages.
ISR mailed Jul. 7, 2008 for PCT Application No. PCT/ US06/ 18180, 2 pages.
OA dated Mar. 6, 2009 for U.S. Appl. No. 11/238,607, 61 pages.
OA dated Apr. 2, 2008 for U.S. Appl. No. 11/238,607, 37 pages.
OA dated May 1, 2009 for U.S. Appl. No. 11/239,567, 35 pages.
OA dated May 30, 2008 for U.S. Appl. No. 11/239,567, 29 pages.
ISR mailed Mar. 4, 2008 for PCT Application No. PCT/ US06/ 18181, 2 pages.
OA dated Nov. 14, 2008 for U.S. Appl. No. 11/239,567, 34 pages.
OA dated Nov. 2, 2007 for U.S. Appl. No. 11/239,567, 23 pages.
OA dated Apr. 22, 2008 for U.S. Appl. No. 11/238,537, 48 pages.
OA dated Apr. 15, 2009 for U.S. Appl. No. 11/238,537, 22 pages.
Ozsoyoglu, et al. Database Systems for Programmable Logic Controllers. Last accessed Apr. 15, 2009, 17 pages.
OA dated Oct. 20, 2008 for U.S. Appl. No. 11/238,537, 44 pages.
ISR mailed May 6, 2008 for PCT Application No. PCT/ US06/ 18122, 1 page.
ISR mailed Jan. 24, 2008 for PCT Application No. PCT/ US06/ 18238, 1 page.

* cited by examiner

TRACKING AND TRACING ACROSS PROCESS BOUNDARIES IN AN INDUSTRIAL AUTOMATION ENVIRONMENT

CROSS-REFERENCE TO RELATED APPLICATION

This application claims the benefit of U.S. Provisional Patent Application Ser. No. 60/680,682, filed on May 13, 2005 and entitled SCHEMA THAT FACILITATES PLANT REPRESENTATION AND RELATED FUNCTIONALITY, the entirety of which is incorporated herein by reference.

TECHNICAL FIELD

The subject invention relates to industrial control systems and, more particularly, to performance of tracking and tracing in industrial automation environments.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts or Function Blocks. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

A common problem associated with control systems is lack of uniformity across system/process boundaries, as well as a lack of uniformity between controller manufacturers, software vendors, and customers. Such non-uniformity can be as simplistic as discrepancies in naming conventions between a software vendor and a customer, or as complex as disparate software representations with respect to portions of an industrial automation framework. Given the above-mentioned discrepancies (as well as a myriad of other discrepancies), a substantial amount of ad-hoc coding is often required to automate a process. Accordingly, significant cost is incurred by a manufacturer to employ computer and programming specialists to generate and maintain ad-hoc programs necessary to automate a manufacturing process. This cost is then passed on to purchasers of the manufactured product.

With more detail regarding conventional controllers, such controllers have been designed to efficiently undertake real-time control. For instance, conventional programmable logic controllers receive data from sensors and, based upon the received data, control an actuator, drive, or the like. These controllers recognize a source and/or destination of the data by way of a symbol and/or address associated with a source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discovered by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Moreover, many of today's industrial environments utilize several processes to create a product, wherein the processes can be classified disparately. For instance, a batch process can be employed, followed by a continuous process, followed by a discrete process, and followed by a process utilized to store and track inventory. These differently classified processes are treated as entirely separate, and intermingling data between such processes is difficult at best. This is because operators of the disparate processes utilize different terminology for similar actions (due mostly to convention and not utility).

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Systems, methodologies, articles of manufacture, and apparatuses are described herein that facilitate performance of tracking and tracing within an industrial automation environment across disparate system/process boundaries. For example, creation of a product can require several different processes to work in conjunction. Conventionally, intermingling data between processes is quite difficult, due both to conventional data structures utilized by programmable logic controllers as well as different terminologies employed by individuals associated with the different processes. To enable tracking and tracing between processes, a common data structure is utilized—thus, data is structured in a substantially similar manner regardless of whether such data is associated with a batch process, a discrete process, a continuous process, or a process associated with inventory. This common data structure provides operators an ability to share data across process boundaries and utilize such data for tracking and tracing purposes with respect to a product. In one example, the common data structure can be a hierarchically structured data model, which can be based at least in part upon ISA S95, ISA S88, OMAC, or any suitable combination thereof.

To provide for robust usage of aspects described herein, metadata can be utilized prior to providing an operator with a graphical user interface depicting tracking and tracing data. For instance, terminology can differ between processes, and attempting to force a new set of terminology upon operators can result in confusion, as operators in different processes often provide different meaning to substantially similar terms. Accordingly, metadata can be appended to data provided to operators to facilitate operator understanding of such data. Furthermore, some industrial automation environments may include programmable logic controllers that cannot receive, implement, or create data that conforms to the hierarchically structured data model. A component that can convert data that is structured in a flat manner to data that conforms to the hierarchically structured data model is described herein to make up for these deficiencies. For instance, templates can be employed to convert the data from data structured in a flat manner to hierarchically structured data. This hierarchically structured data can then be employed in connection with performing tracking and tracing of objects between disparate processes.

In another example, it may be desirable to create tracking and tracing data and provide such data to a remote client. For example, an executive may have an interest in happenstances in a plant with respect to a certain product while on a sales trip. The sales manager can utilize the Internet to log onto a secure server associated with the plant (after entering identity information). Thereafter, tracking and tracing data can be provided to the executive by way of the Internet. Thus, metrics across processes can be available at any time from any location.

To the accomplishment of the foregoing and related ends, certain illustrative aspects are described herein in connection with the following description and the annexed drawings. These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
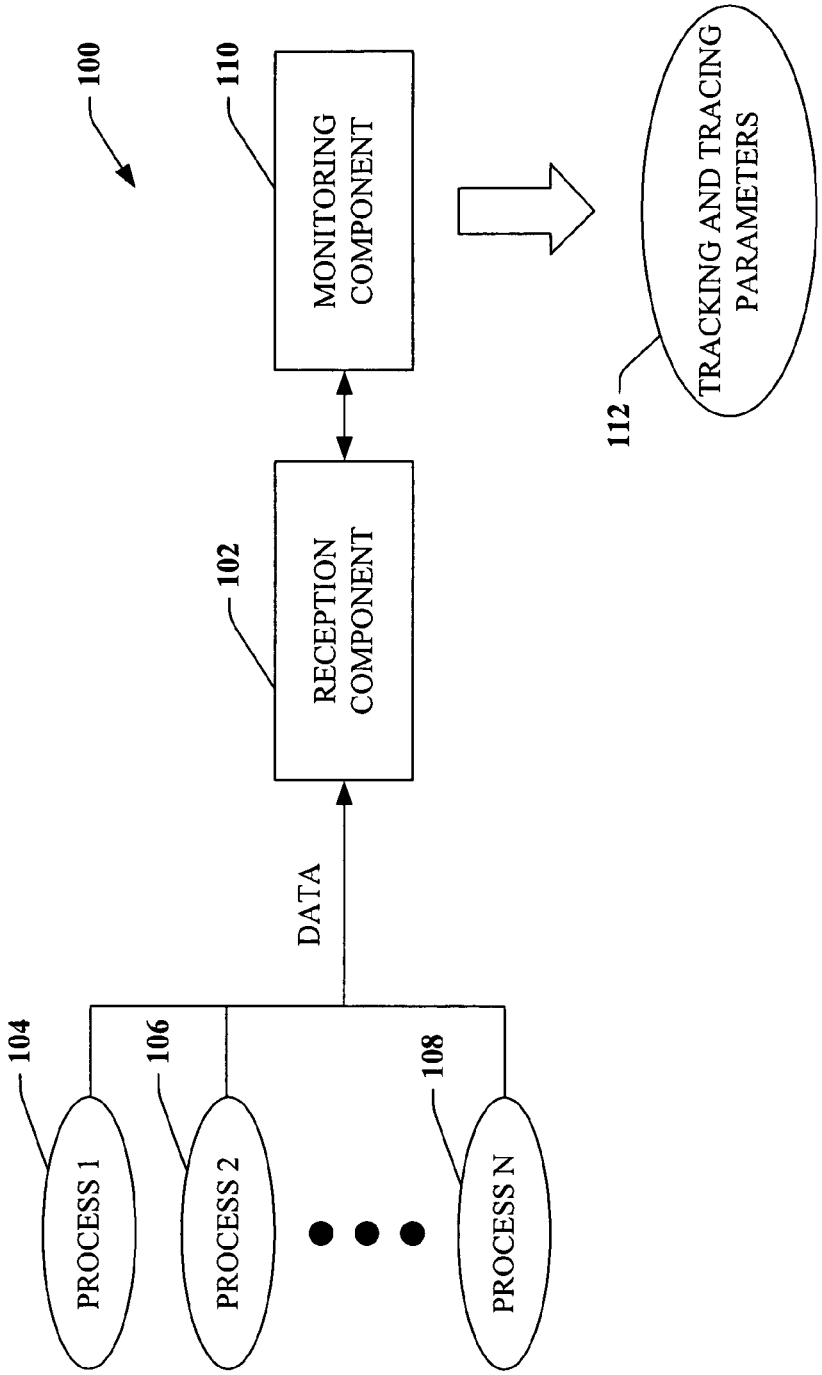
FIG. 1 is a high-level system block diagram of a system that facilitates tracking and tracing across process boundaries.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates tracking and tracing of products across process boundaries. The system 100 includes a reception component 102 that receives data relating to a plurality of processes 104-108 utilized in connection with creating a product. For example, the process 104 can be a batch process, the process 106 can be a continuous process, the process 108 can be a discrete process, etc. Furthermore, the data can conform to a hierarchically structured data model, thereby enabling a robust representation of an entirety of a factory to be generated. The reception component 102 is communicatively coupled to a monitoring component 110, which can analyze the data received from disparate processes and output tracking and tracing parameters 112. Thus, for example, an operator can simultaneously view data relating to multiple processes with respect to a product, and can view relationships between such processes. With regards to the term tracking, such term broadly refers to uniform building of a track of objects that are forwarded to, processed for, applied in, or disposed of usage. An obtained track is a map depicted or coordinates listed in real-time of reckoned locations of an object. Similarly, tracing refers to uniformly generating a sample of traces of objects that are forwarded to, processed for, applied in, or disposed of usage. An obtained trace is a map depicted or coordinates listed retrospectively from reckoned events of occurrence of an object at issue. Tracking and tracing are related but not synonymous, and are often utilized conjunctively for imposing control on performing logistics. The monitoring component 110 can facilitate tracking and tracing across process boundaries.

In contrast, conventionally processes are treated as separate entities, rendering it difficult if not impossible to quickly determine relation with respect to a product between processes. In a detailed example, manufacturing a consumable item can include creating a large quantity of such item (a batch process), transporting portions of the item to a packaging location (a continuous process), packaging the item in individual containers (a discrete process) and storing the packaged items for shipping (an inventory-related process). Accordingly, today it is possible to perform tracking and tracing with respect to a product within a single process. Without the system 100, however, data is not shared or reviewable between processes. In other words, an operator of the continuous process cannot review batch processing data and determine a relationship between the processes (e.g., a map or coordinates depicted in real-time across processes in a single interface is extremely difficult to generate).

With more detail regarding the hierarchically structured data model, such model can be based at least in part upon ISA S88, ISA S95 , OMAC, and/or any suitable combination thereof. Accordingly, the data received by the reception component 102 can be representative of particular devices, portions of device, processes, portions of processes, and the like. Programmable logic controllers (not shown) utilized to control devices/processes can include at least a portion of a schema that enables such controllers to recognize and output data that is structured in accordance with the hierarchically structured data model. The programmable logic controllers, through utilization of this data model, can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller, thereby enabling seamless communication between programmable logic controllers and ERP systems. Convention systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable the data received by the reception component 102 to correspond to a hierarchical arrangement of devices and/or a hierarchical arrangement of processes that occur within the plant. Furthermore, the hierarchically structured data model can be designed in a manner that enables modeling of a plant across system and/or process boundaries. The hierarchically structured data model can be implemented so that a substantially similar structure is provided with respect to a batch process, a continuous process, a discrete process, and inventory tracking.

An example is provided herein to illustrate one or more applications of the system 100. The process 104 can be a batch process for creating a batch of an item, the process 106 can be a discrete process for packaging the item in disparate packages, and the process 108 can relate to storing the packages as inventory. These disparate processes can operate sequentially and continuously - therefore, the process 104 can be in operation at a substantially similar time as the process 106 and the process 108. The reception component 102 can receive data from the processes 104-108, and such data can be relayed to the monitoring component 110. An operator of the process 104 (the batch process) can request tracking and tracing data from the monitoring component 110, which may depict that inventory is nearing capacity. Thus, it would be undesirable to create another batch of the consumable prior to reducing inventory. Furthermore, the monitoring component 110 to effectuate generation of tracking and tracing data can correlate materials data and equipment data. Thus, representation of material and equipment information can occur simultaneously in a control engineering environment. For instance, the hierarchically structured data model can include definitions of material phases correlated to equipment phases, which represent definitions of material flow and equipment sequencing views of a manufacturing system. This can enable representation of personnel flow as in work flow views in a manufacturing environment.

Figure 2:
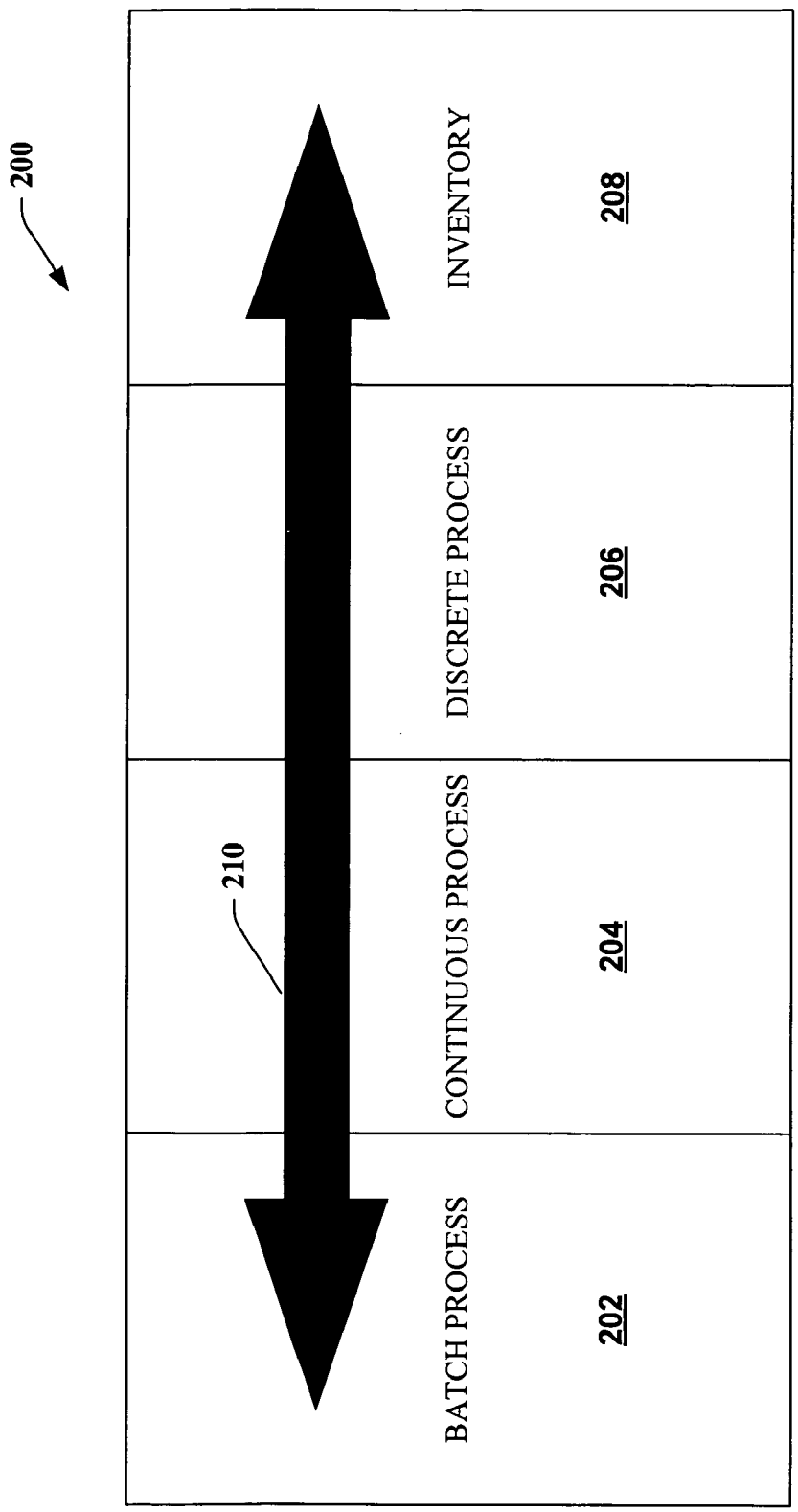
FIG. 2 is a depiction of creation of a product across multiple processes.

Now referring to FIG. 2, a graphical depiction 200 of utilization of data across process boundaries is illustrated. In more detail, a batch process 202, a continuous process 204, a discrete process 206, and an inventory-related process 208 are shown as being related to one another. For instance, these processes 202-208 can be utilized in sequence in connection with creating a market-ready product. It is understood, however, that any suitable arrangement of processes can be utilized in connection with creating a product. Due to relatedness of the processes 202-208, portions of material 210 can be tracked/traced in between such processes. This tracking can be facilitated through use of RFID tags, status of sensors/actuators associated with one or more programmable logic controllers, etc. Thus, maps or coordinates of portions of a material can be provided to operators in real-time and/or in retrospect for analysis of one or more processes.

Figure 3:
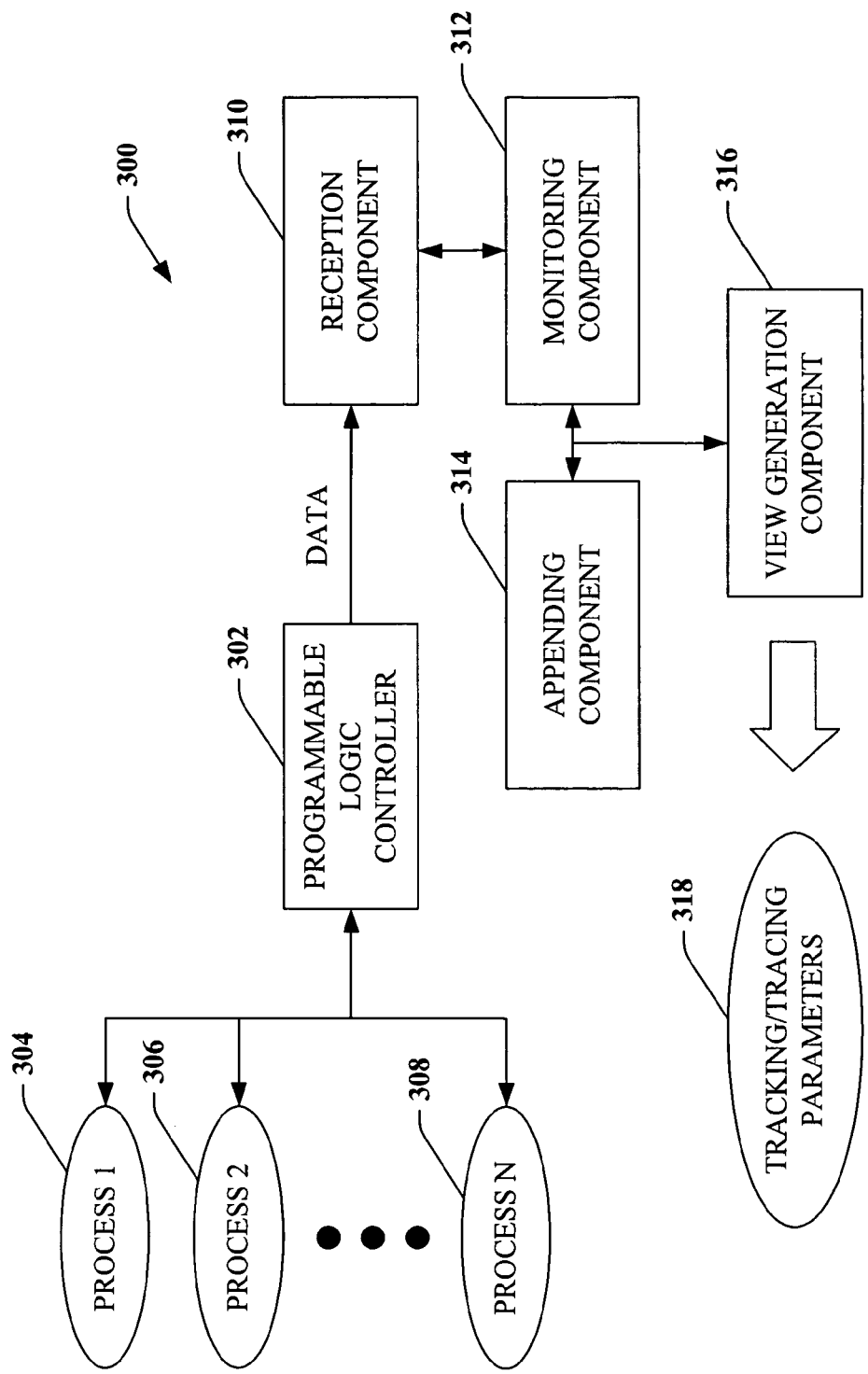
FIG. 3 illustrates a system that facilitates appending metadata to tracking and tracing data, thereby enabling an operator to receive data that such operator can understand.

Turning now to FIG. 3, a system 300 that facilitates performance of tracking and tracing across system/process boundaries is illustrated. The system 300 includes a programmable logic controller 302 that is utilized to control a plurality of processes 304-308. In an actual industrial environment, it is understood that each process 304 can include multiple programmable logic controllers—however, for sake of brevity the single programmable logic controller 302 is illustrated as being utilized to control at least a portion of each of the processes 304. For instance, the programmable logic controller 302 can be configured to receive data from sensors associated with the processes 304-308 and thereafter drive actuators based upon sensed data. Data relating to tracking and tracing of materials/objects can be gleaned with respect to status of the sensors/actuators. The programmable logic controller 302 can then relay data associated with the processes 304-308 to a reception component 310. The relayed data can conform to a hierarchically structured data model, and can be based at least in part upon ISA S95, ISA S88, and/or OMAC. Using this hierarchically structured data model, a consistent data representation can exist between processes 304-308. In contrast, conventionally data between disparate processes is created in different formats for disparate programmable logic controllers. The hierarchically structured data model facilitates standardization of a data structure throughout an enterprise.

The reception component 310 can relay data from the programmable logic controller 302 to a monitoring component 312, which can undertake a tracking and tracing application with respect to entities created within the processes 304-308. For example, the monitoring component 312 can aggregate metadata associations upon receipt of a message relating to tracking and tracing (or at any suitable later time). In other words, metadata can be incrementally added to tracking and tracing data over time. The monitoring component 312 can be associated with an appending component 314 that appends metadata to output of the monitoring component 312. For instance, disparate terminology is employed by different operators of processes. In more detail, a batch process operator may utilize different terminology with respect to a sub-process than terminology utilized by a continuous process operator for a substantially similar sub-process. Thus, depending on the operator, the appending component 314 can append disparate metadata to output of the monitoring component 312. A view generation component 316 can then be employed to create a particular view depending upon the operator and output tracking/tracing parameters 318 within the generated view. For instance, the view generation component 316 can create a high-level view of a factory, and then cause tracking/tracing data to be overlaid atop the high-level view with terminology desired by an operator.

Figure 4:
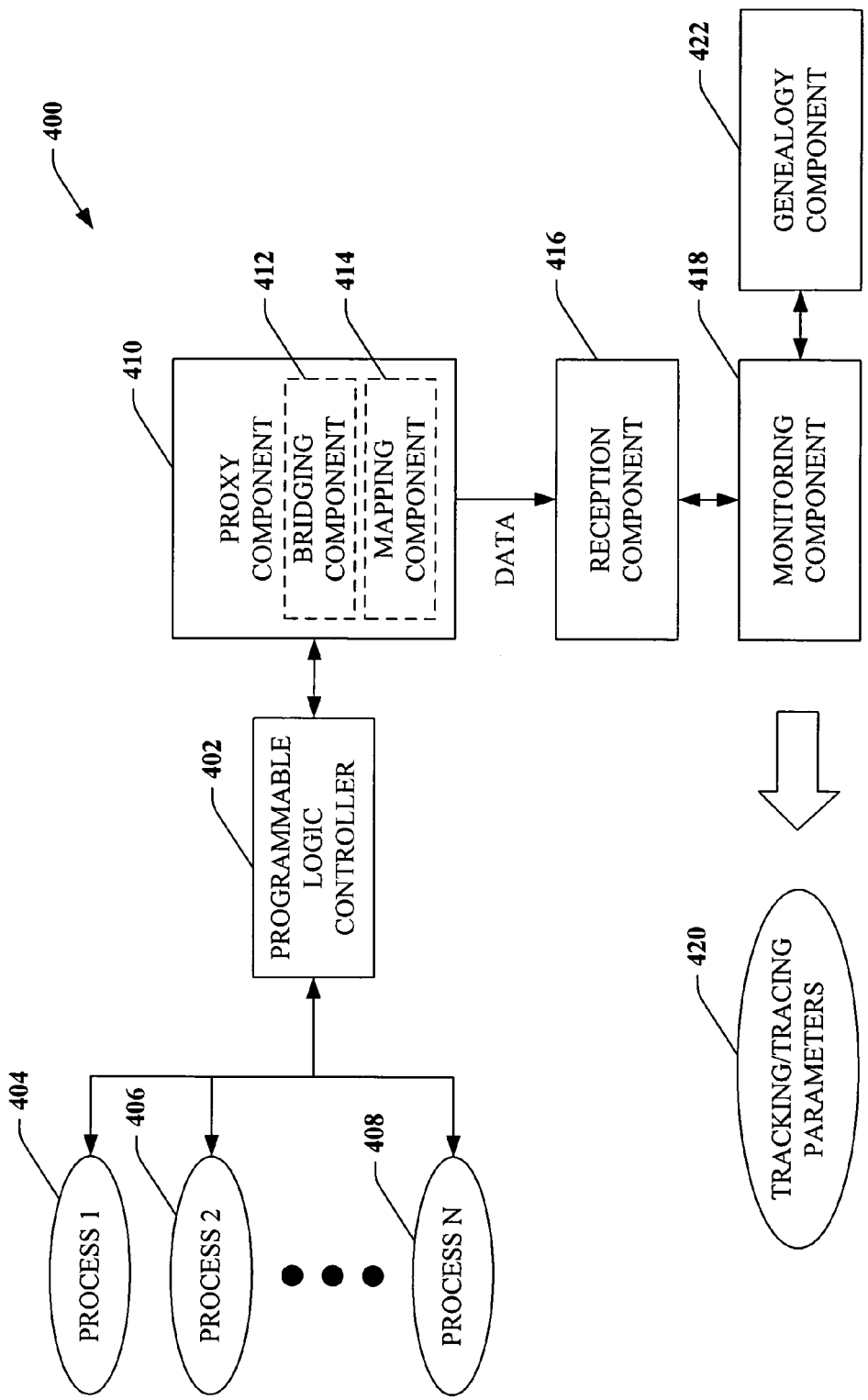
FIG. 4 illustrates a system that facilitates utilization of legacy devices in connection with performing tracking and tracing across process boundaries.

Turning now to FIG. 4, a system 400 that facilitates tracking and tracing of entities within an industrial environment is illustrated. The system 400 includes a programmable logic controller 402 that is utilized to control one or more processes 404-408. As described above, it is understood that more than a single programmable logic controller can control the processes 404-408, and the processes 404-408 can associated with disparate classifications (e.g., batch, continuous, discrete, . . . ). Furthermore, the programmable logic controller 402 can be a legacy device or a controller designed in such a manner that it does not support a hierarchically structured data model. For example, companies will not wish to entirely replace each programmable controller upon introduction of the hierarchically structured data model. Therefore, systems, methods, and apparatuses for performing tracking and tracing across system/process boundaries should be created to interact with legacy devices.

Accordingly, a proxy component 410 is provided, where the proxy component 410 facilitates mapping the data from the programmable logic controller 402 to data that conforms to the hierarchically structured data model. In more detail, the proxy component 410 can include a bridging component 412 that operates as a bridge between disparate networks. For example, the programmable logic controller 402 may be adapted to send/receive data over a first network protocol, such as ProfiBus, FieldBus, Foundation FieldBus, Hart, or the like, while a component that facilitates tracing and tracing across system bounds may need to receive data over a disparate network protocol, such as the Common Industrial Protocol (CIP). The bridging component 412 can recognize that data from the programmable logic controller 402 is packaged in accordance with the first network protocol and thereafter re-package such data so that it conforms to the second network protocol. The bridging component 412 can be associated with a mapping component 414 that can reformat the data so that it is in accordance with the hierarchically structured data model. For instance, the mapping component 414 can access templates associated with a data model employed by the programmable logic controller 402 and utilize such templates to map the data to the hierarchically structured data model.

Hierarchically structured data from the proxy component 410 can be received at a reception component 416, which in turn can relay the data to a monitoring component 418. The monitoring component 418 can review and analyze data relating to the disparate processes 404-408 and generate tracking and tracing parameters 420 across boundaries of the processes 404-408. For instance, a map of a track of objects across the processes 404-408 can be created by the monitoring component 418. The monitoring component 418 can also be associated with a genealogy component 422, which can review previous tracking and tracing data and compare it with current tracking and tracing parameters. This comparison can be useful for maintenance of the processes 404-408 as well as for study of efficiencies between operators associated with the processes 404-408. Moreover, the genealogy component 422 can be utilized to create genealogy records across process boundaries over time. For example, records indicating versioning of objects utilized within a process, materials utilized within disparate processes, and the like can be created by the genealogy component 422. This enables creation of robust genealogy records across process boundaries over time.

Figure 5:
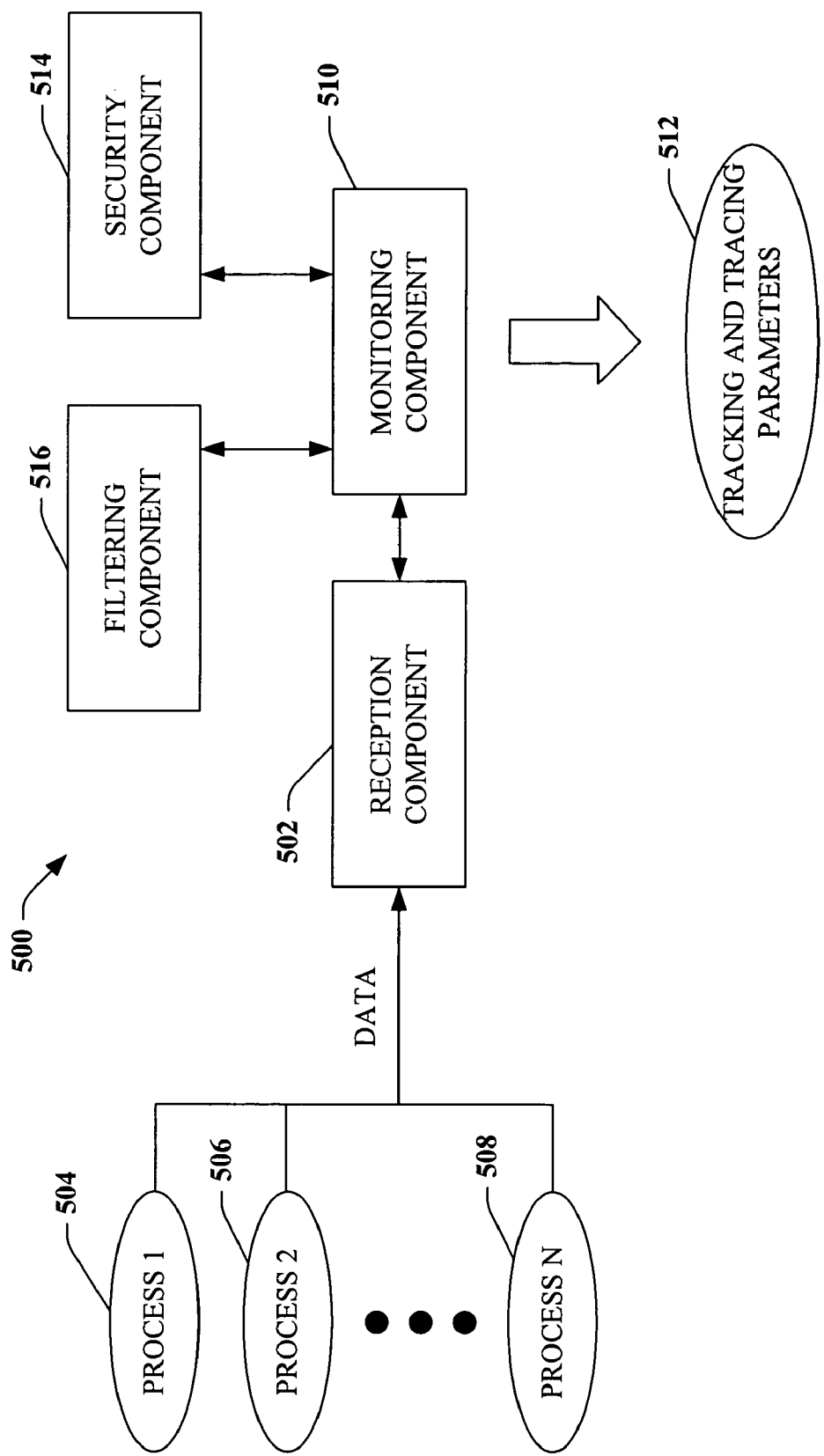
FIG. 5 illustrates a system that facilitates authorizing an entity prior to providing tracking and tracing data to the entity.

Now turning to FIG. 5, a system 500 that facilitates tracking and tracing entities that cross multiple processes is illustrated. The system 500 includes a reception component 502 that receives data relating to multiple processes 504-508, wherein the processes 504-508 can be classified disparately. For instance, programmable logic controllers (not shown) utilized to control the processes (or sub-processes therein) can provide the data to the reception component 502. Furthermore, the data can be created in accordance with a hierarchically structured data model, which can be based at least in part upon ISA S95, ISA S88, and/or OMAC. This data can thereafter be provided to a monitoring component 510. The monitoring component 510 can analyze the data and provide tracking and tracing parameters 512 to a user. For instance, a map or coordinates of a sample of traces can be provided, wherein such traces can exist across boundaries of the processes 504-508. Moreover, genealogy records can be created across process boundaries over time.

Prior to providing the user with the tracking and tracing parameters 512, however, a security component 514 can be employed to ensure that an entity (user) requesting the tracking and tracing parameters 512 is authorized to review such parameters 512. The security component 512 can request identifying data from an entity requesting review of the parameters 512, such as username, password, personal identification number, digitized biometric indicia, or any other suitable data. The security component 512 can then analyze the provided data and determine whether the requesting entity is authorized to review the tracking and tracing parameters 512. For instance, the security component 512 can review a table that includes identities of entities and authorization levels associated therewith.

In still another example, the security component 512 can ensure that the system 500 is associated with sufficient physical resources to enable addition of data to the system 500 by an entity or device. For instance, the security component 512 can determine that at least a portion of the system 500 is not associated with a power source, and inform an operator of such lack of power. In another example, the security component 512 can determine that at least a portion of the system 500 is associated with insufficient memory or processing capabilities to generate the tracking and tracing parameters 512 and/or genealogy records. Still further, the security component 512 can consider an entity/user's context, such as entity/user's role (operator, technician, electrician, . . . ), an entity/user's scenario (routine maintenance, plant diagnostics, . . . ), and such context can be input to the security component 512 and employed to manage access to the system 500. Further, the security component 512 can account for configuration of the system 500 as well as connected devices. Still further, the security component 512 can analyze created records and determine whether a manually entered event is physically possible, and whether a user entering an event is authorized to undertake such entry. Moreover, prior to the monitoring component 510 providing the tracking and tracing parameters 512 to a user, a filtering component 516 associated with the monitoring component can filter the parameters 512 based at least in part upon user identity. For instance, the filtering component 516 can prohibit particular individuals/entities from receiving portions of the tracking and tracing parameters with which they have no association.

Figure 6:
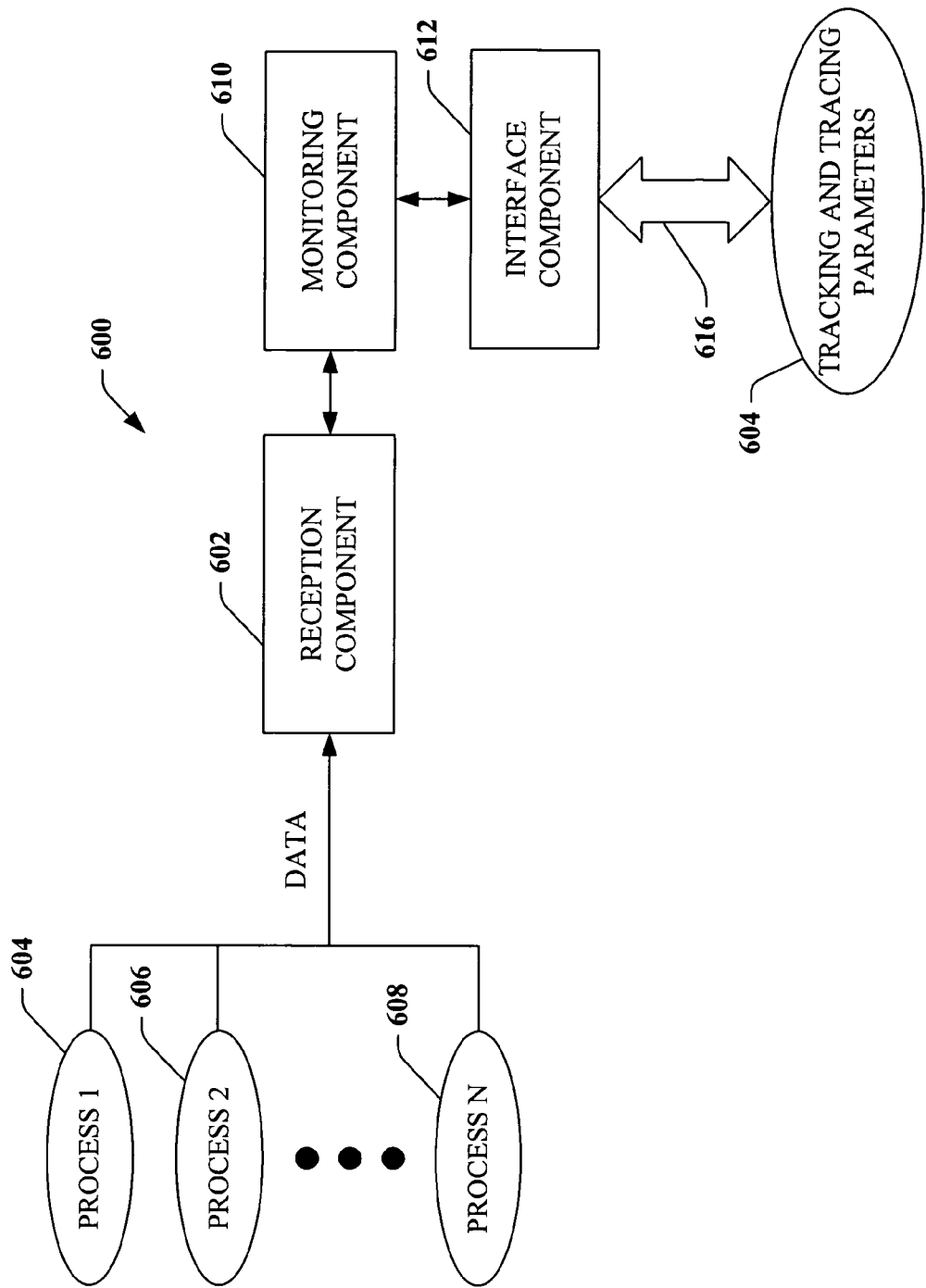
FIG. 6 illustrates a system that facilitates distribution of tracking and tracing data over the Internet.

Turning now to FIG. 6, a system 600 that facilitates creation of tracking and tracing parameters across process boundaries is illustrated. The system 600 includes a reception component 602 that receives data that can be utilized for tracking and tracing of one or more objects. The data can be associated with a plurality of processes 604-608 that are utilized for manufacturing products, wherein each of the processes can be classified differently. For instance, the process 604 can be a batch process, the process 606 can be a continuous process, etc. Moreover, the data received by the reception component 602 can conform to a hierarchically structured data model. Furthermore, the data can be received from one or more programmable logic controllers that are utilized to control the processes 604-608.

The reception component 602 can provide the data to a monitoring component 610, which can be utilized to generate maps or coordinates for utilization in connection with tracking and tracing an object or objects associated with the processes 604-608. The mapping component 610 can further be employed in connection with generating one or more genealogy records over time, wherein the genealogy records are associated with objects, materials, and the like relating to disparate processes. An interface component 612 can be associated with the monitoring component 610 and utilized to relay tracking and tracing parameters 614 over the Internet 616 or an intranet to a remote operator. For example, one need not be proximate to a workcell or line to receive the tracking and tracing parameters 614. In contrast, an executive located in a hotel at a remote distance from the processes 604-608 can receive the tracking and tracing parameters 614 by way of the Internet 616 (and the interface component 612). For instance, the interface component 612 can include hardware (such as ports, cabling, and the like) as well as software (e.g., software supporting a protocol stack associated with the Internet 616).

Figure 7:
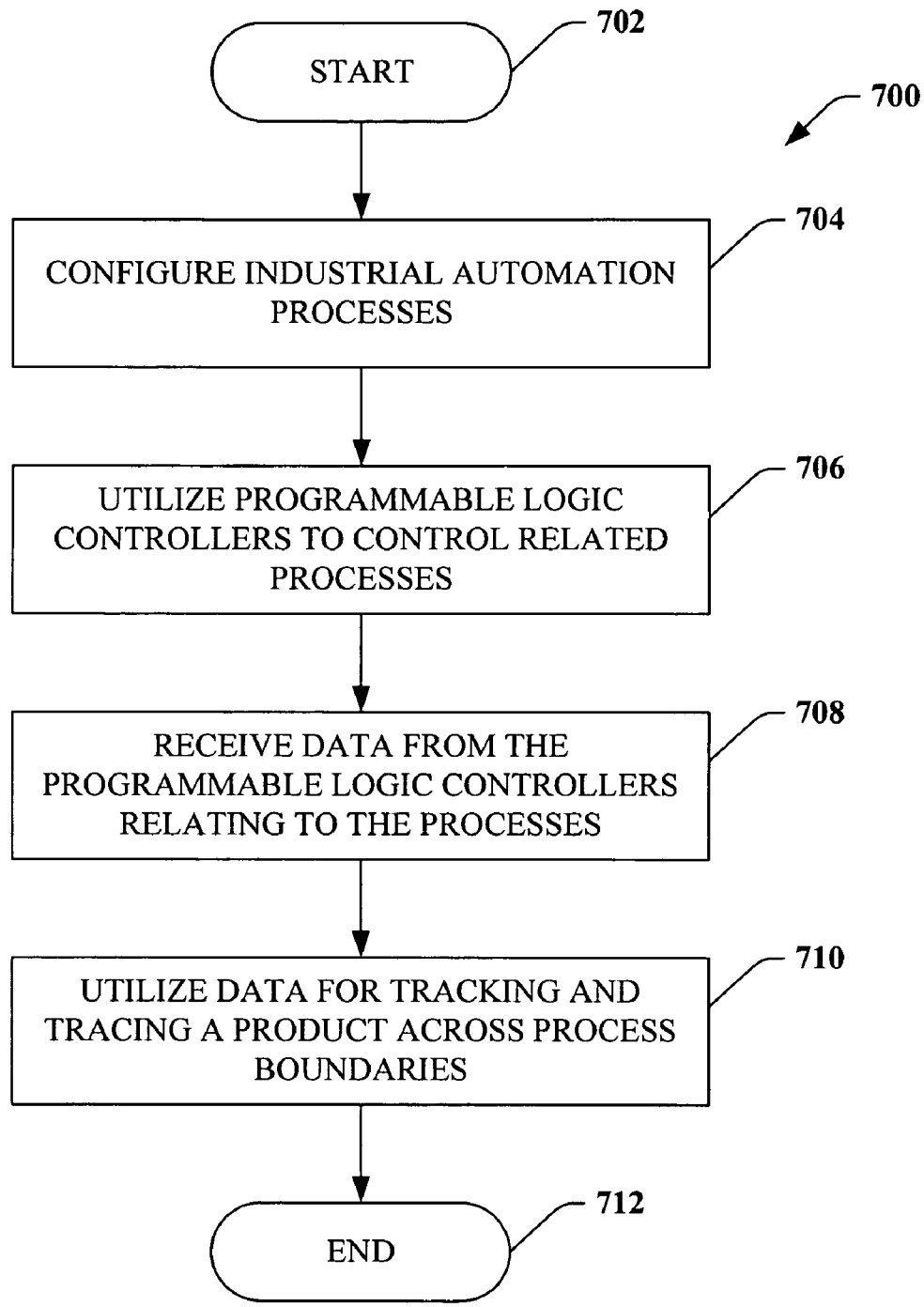
FIG. 7 illustrates a representative flow diagram of a methodology for performing tracking and tracing across process boundaries.
Figure 8:
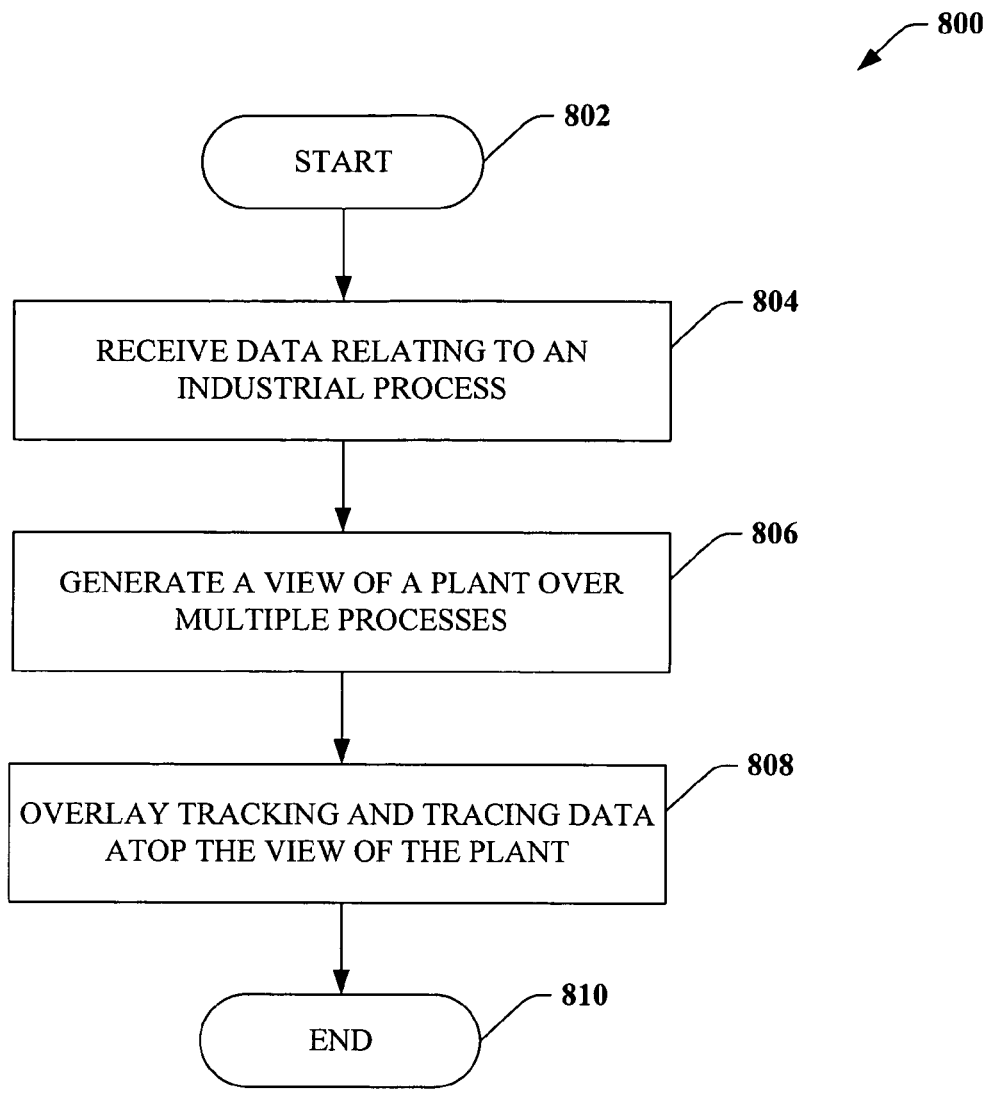
FIG. 8 is a representative flow diagram for generating a graphical display for tracking and tracing data.
Figure 9:
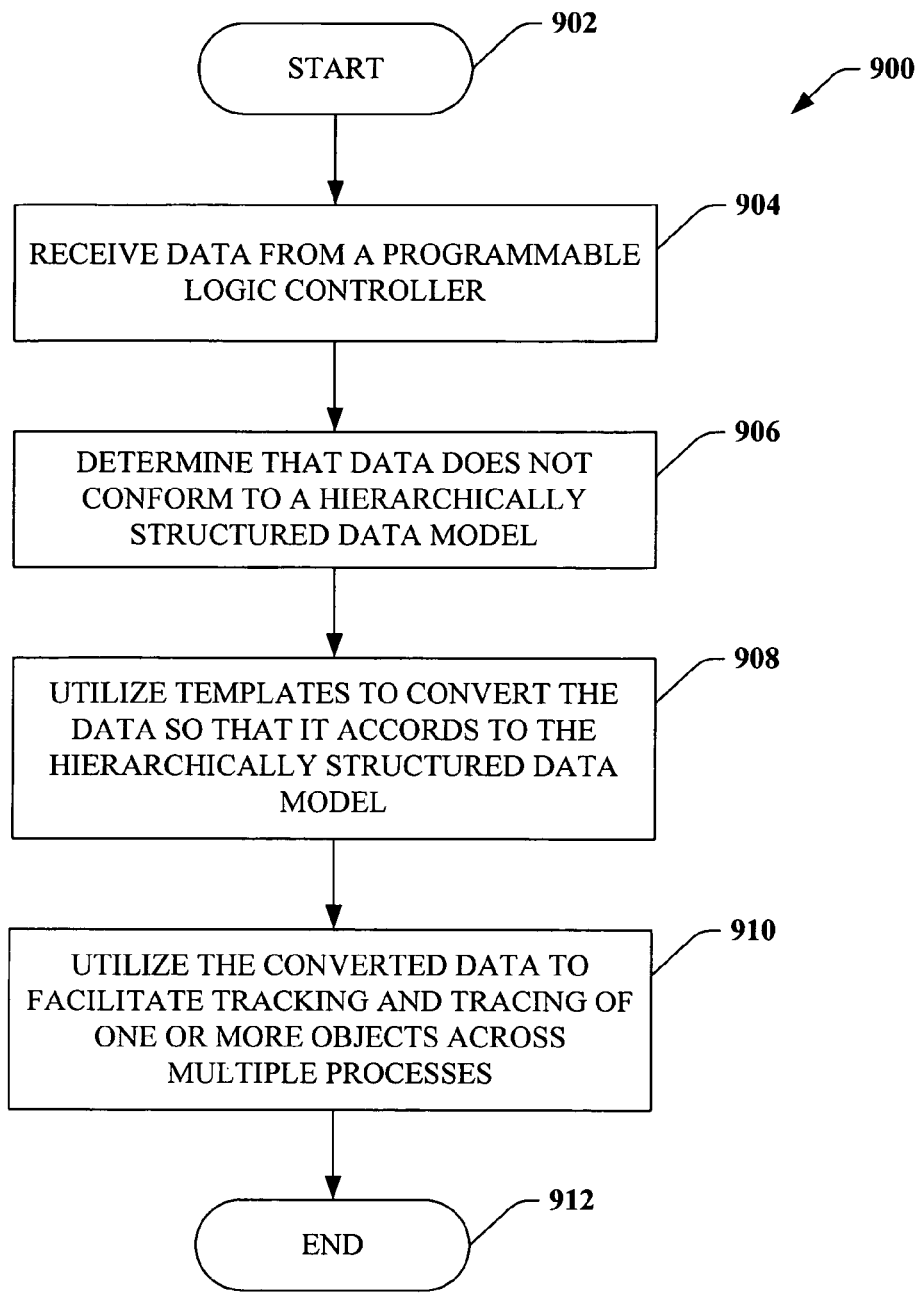
FIG. 9 is a representative flow diagram of a methodology for converting data so that it conforms to a hierarchically structured data model and then utilizing such data for tracking and tracing across processes.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for tracing and tracing an object or objects across process boundaries in an industrial automation environment is illustrated. The methodology 700 begins at 702, and at 704 industrial processes are configured. For instance, the industrial processes can relate to manufacturing of a consumable, which can include batch processes, continuous processes, discrete processes, inventory-related processes, etc. At 706, one or more programmable logic controllers are utilized to control the processes, wherein a subset of the programmable logic controllers can be configured to receive, execute, and create data that conforms to a hierarchically structured data model. This enables controllers to be more intelligent regarding processes, devices, and systems that they are controlling.

At 708, data is received from at least one of the programmable logic controllers, wherein the data relates to the process(es) controlled by the programmable logic controller. For instance, the data can be related to status of sensors and actuators in particular lines, work cells, etc. Furthermore, the data can be received through use of RFID tags on particular objects subject to processing. Any suitable manner of receiving data, therefore, is contemplated and intended to fall under the scope of the hereto-appended claims. At 710 the received data is utilized for tracking and tracing one or more objects across boundaries of the processes. Thus, tracking and tracing is not limited to particular processes, but can be undertaken between two or more disparate processes. Furthermore, the received data can be employed in connection with generating genealogy records across process boundaries over time. The methodology 700 then completes at 712.

Referring now to FIG. 8, a methodology 800 for providing a view of a plant and overlaying tracking and tracing data upon such view is illustrated. The methodology begins at 802, and at 804 data is received relating to an industrial process. As described above, the data can conform to a hierarchically structured data model, such as one that is based at least in part upon ISA S88, ISA S95, OMAC, or any suitable combination thereof. This hierarchically structured data model enables a common data structure to be utilized throughout an enterprise. At 806, a view of a plant is generated over multiple processes. This view can be created based at least in part upon parameters associated with the received data. More particularly, through analysis of the data, it can be determined which device, line, work cell, factory, process, sub-process, and the like that the data is associated with. Through aggregation of data across multiple processes, a representative view of several processes can be generated and status associated with such processes can be displayed. At 808, tracking and tracing data is overlaid atop the view of the plant. Thus, coordinates associated with objects across process lines can be provided to an operator or other interested entity. The methodology 800 completes at 810.

Now referring to FIG. 9, a methodology 900 for tracking and tracing objects across several industrial processes is illustrated. The methodology begins at 902, and at 904 data is received from a programmable logic controller. At 906, it is determined that the data from the programmable logic controller does not conform to a hierarchically structured data model. For instance, the programmable logic controller can be a legacy controller that does not support hierarchically structured data. At 908, templates are utilized to convert the data so that it accords to the hierarchically structured data model. For instance, if the programmable logic controller is of a particular type, a template relating to such type of programmable logic controller can be employed to transform the data so that it conforms to the hierarchically structured data model. At 910, the converted data is utilized to facilitate tracking and tracing of one or more objects across multiple processes (e.g., batch processes, continuous processes, discrete processes, . . . ).

Figure 10:
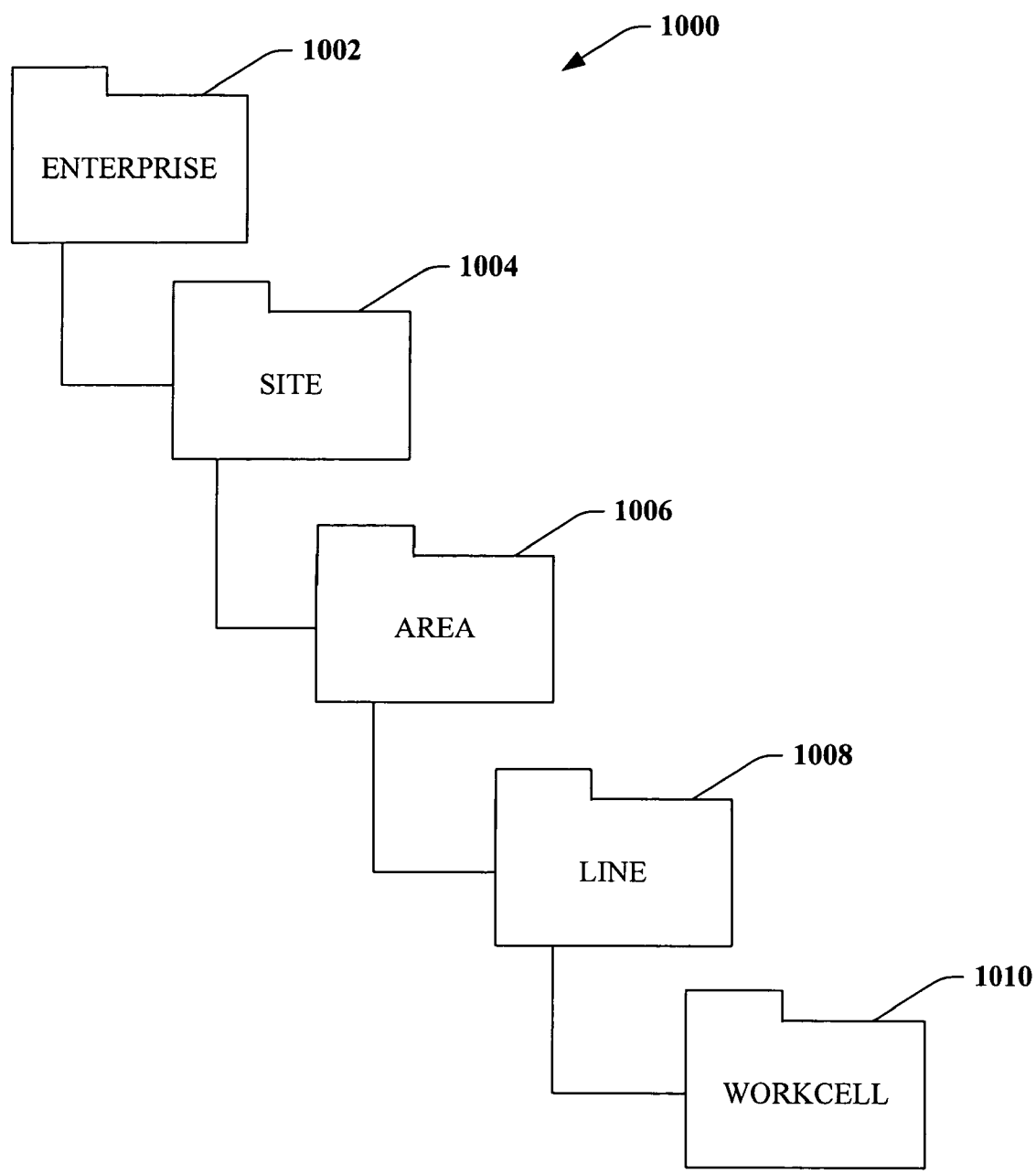
FIG. 10 is a visual representation of an exemplary structure upon which the hierarchically structured data model can be based.

Referring now to FIG. 10, an exemplary hierarchical structure 1000 which can be utilized in connection with the hierarchically structured data model described herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/ levels can be defined within the hierarchy 1000.

Figure 11:
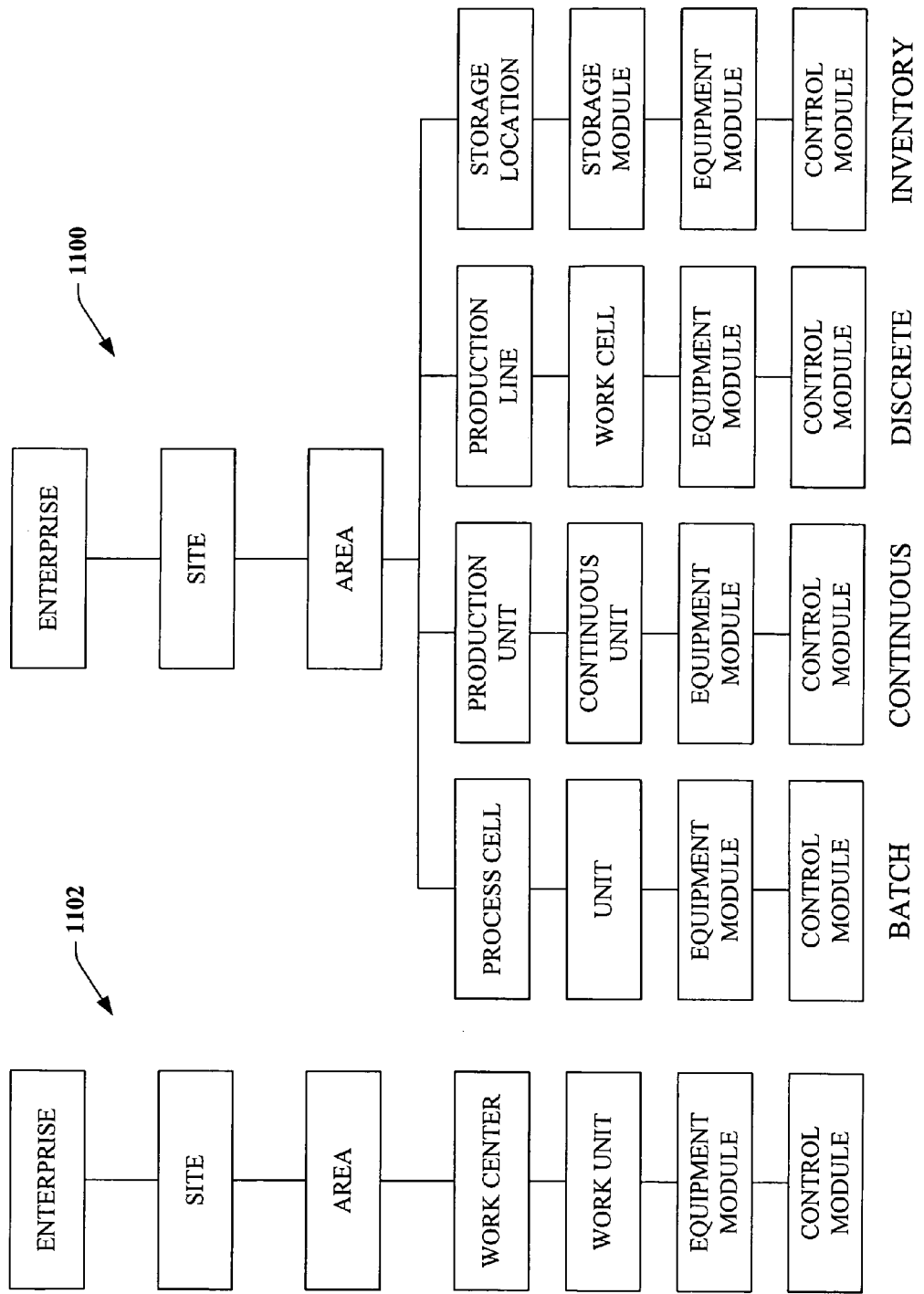
FIG. 11 illustrates exemplary hierarchies that can be utilized in connection with the hierarchically structured data model.

Now turning to FIG. 11, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 1100 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 1102 can be utilized that represents each of the aforementioned hierarchical representations. The hierarchy 1102 can include representations of an enterprise, a site, an area, a work center, a work unit, an equipment module, and a control module. Thus, a common representation can be generated that adequately represents the hierarchy 1100. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 1100). Metadata can be employed to enable display of such data in accordance with known, conventional usage of such data. Thus, implementation of a schema in accordance with the hierarchy 1102 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 1102 (or similar hierarchy) within a controller.

Figure 12:
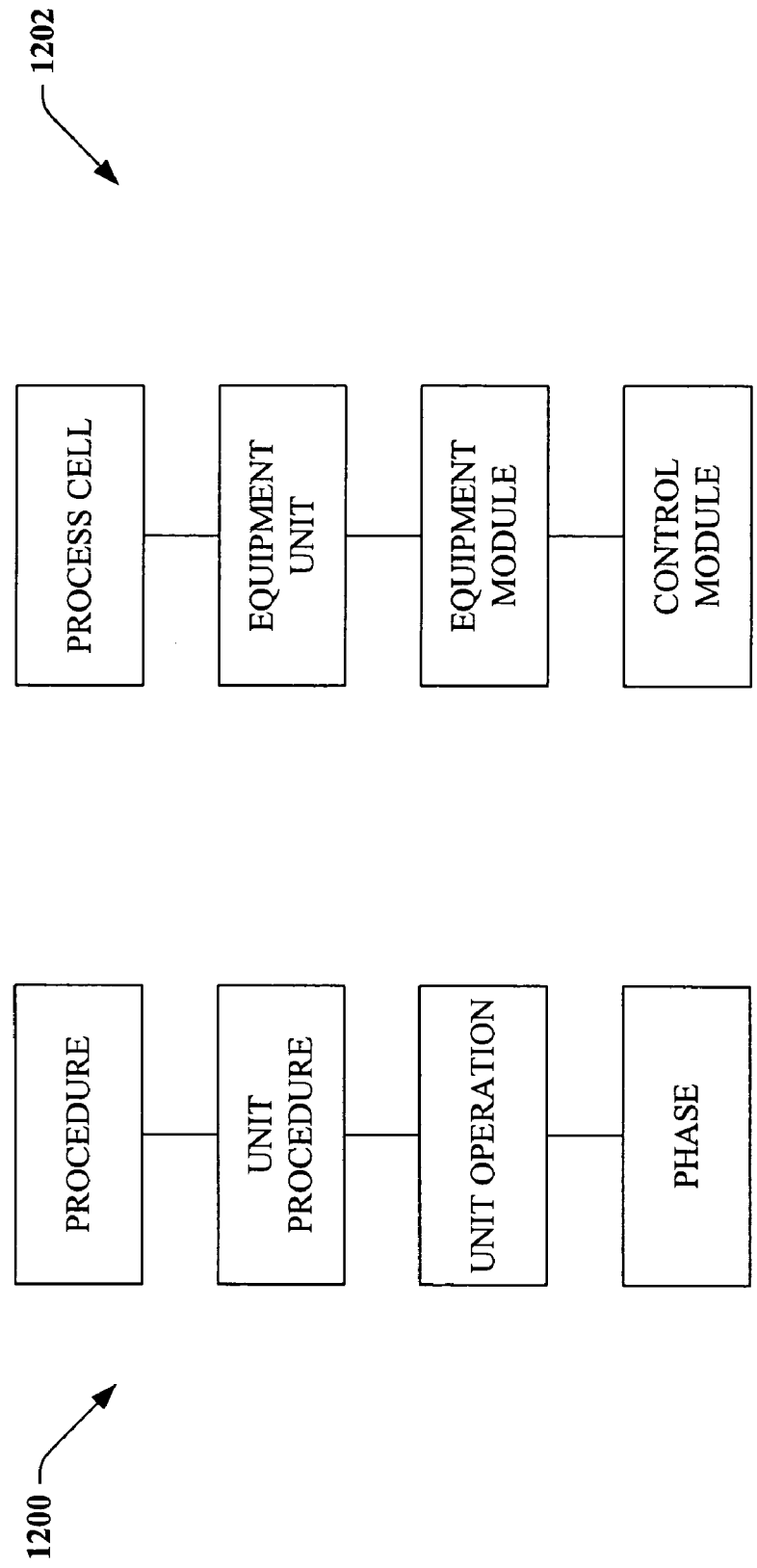
FIG. 12 illustrates exemplary hierarchies that can be utilized in connection with the hierarchically structured data model.

Now referring to FIG. 12, standard hierarchies that can be utilized to represent procedures and equipment are illustrated. In particular, a hierarchy 1200 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, and pausing a motor, opening and closing a valve, and the like. A hierarchy 1202 relating to a representation of equipment in, for example, a batch process is displayed adjacent to the hierarchy 1200. The representations within the hierarchy 1202 were described in greater detail with respect to FIG. 11.

Figure 13:
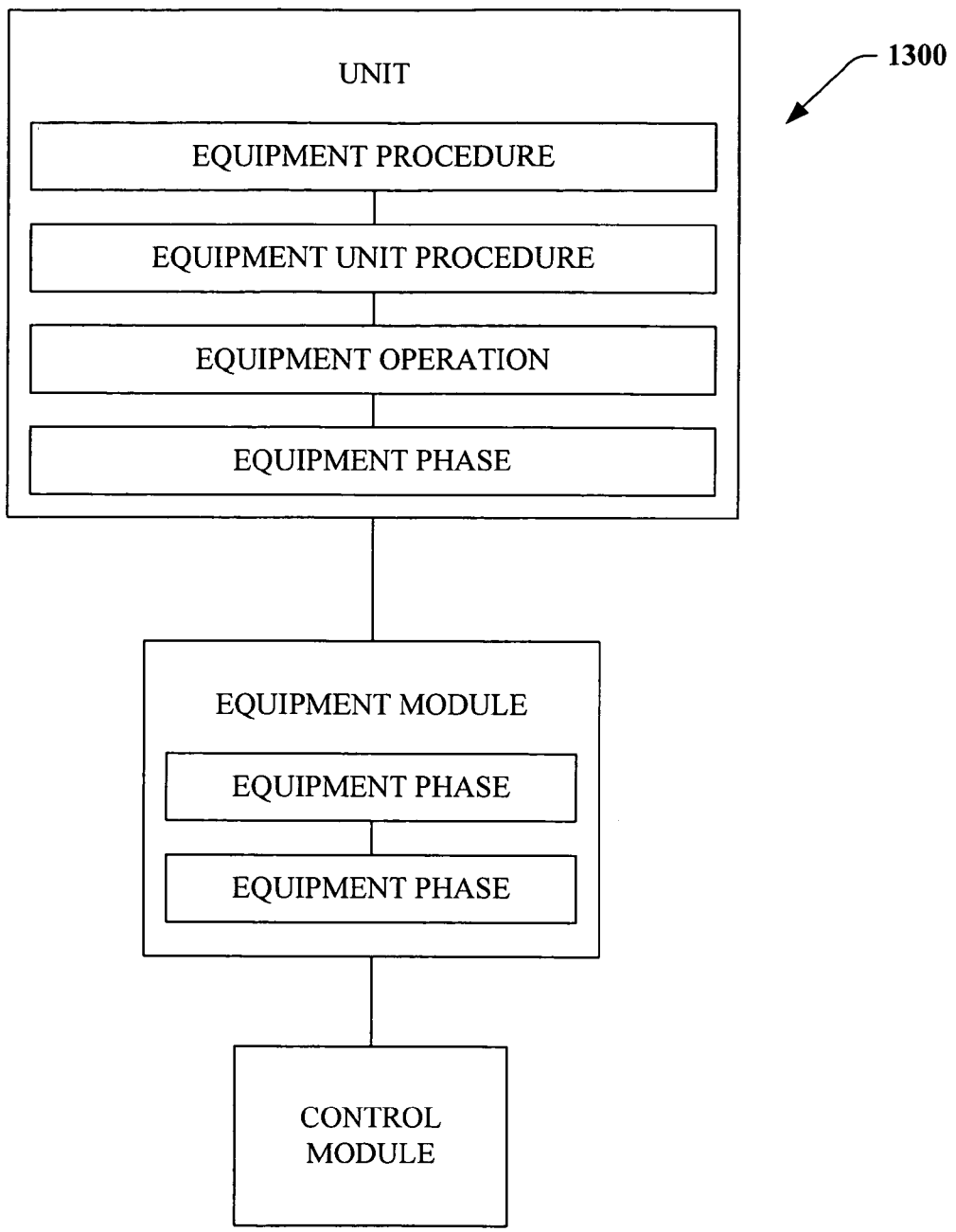
FIG. 13 illustrates an exemplary combination of hierarchies.
Figure 14:
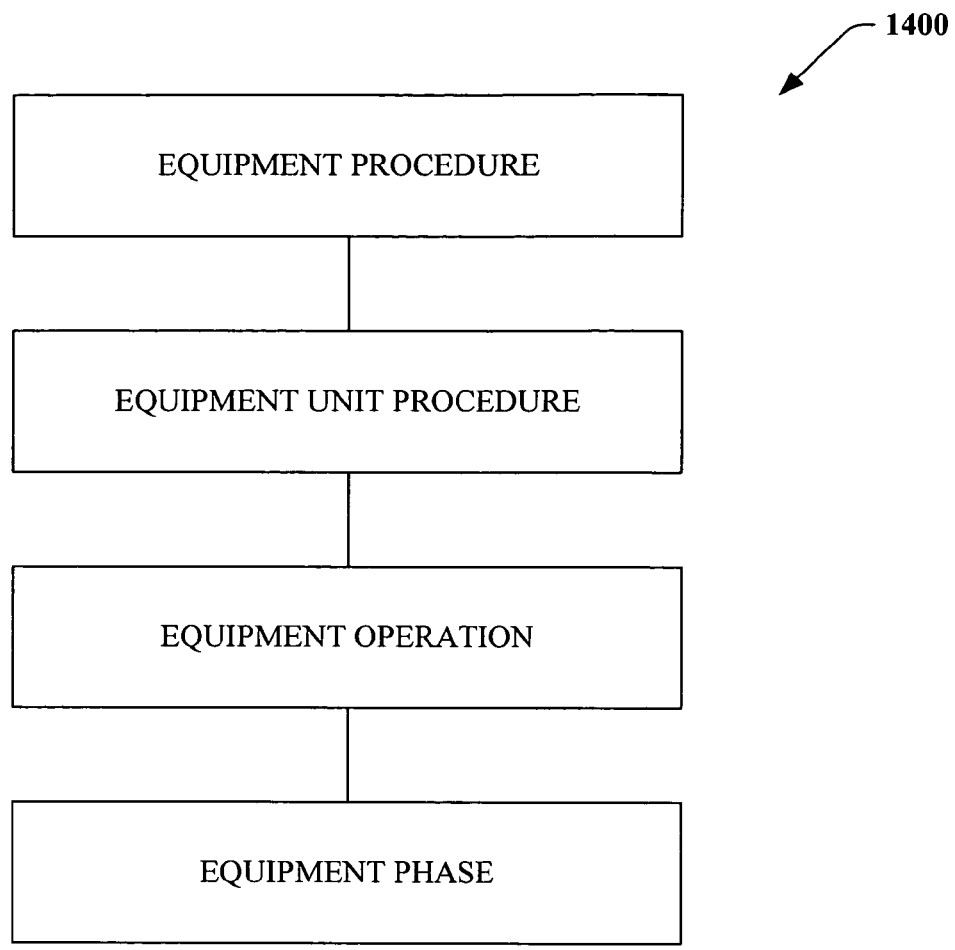
FIG. 14 illustrates an exemplary combination of hierarchies.

Now turning to FIG. 13, a hierarchy 1300 that represents one possible integration of the hierarchies 1200 and 1202 (FIG. 12) is illustrated. A unit (such as a work unit described in FIG. 11) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 14, a hierarchy 1400 that can be utilized in connection with equipment control is illustrated. The hierarchy is substantially similar to that described within the unit portion of the equipment unit. As stated above, the hierarchies illustrated in FIGS. 12-14 can be based upon a standard, such as ISA S88, ISA S95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 12-14 can be existent within a controller, together with state machines that enable creation of such objects.

Figure 15:
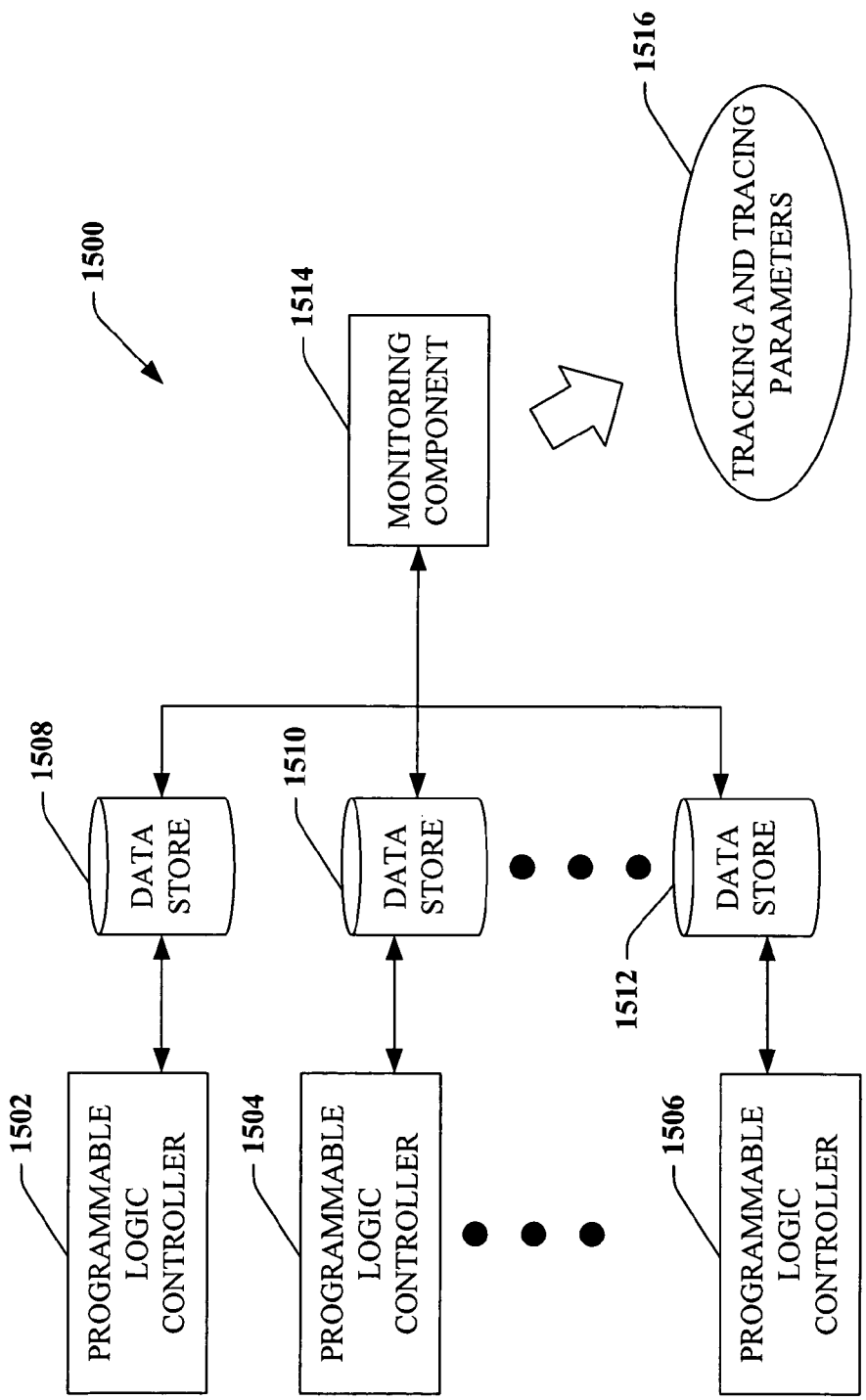
FIG. 15 illustrates an exemplary system that depicts aggregation of data between multiple controllers and multiple data stores.

Turning now to FIG. 15, an exemplary system 1500 that facilitates tracking and tracing of factory-related parameters across process boundaries is illustrated. The system 1500 includes multiple programmable logic controllers 1502-1506 that can contribute to track and trace data collection. For example, a plant can have several hundred controllers that contribute to tracking and tracing capabilities across multiple areas of a plant. Furthermore, while the system 1500 is illustrated to include a plurality of programmable logic controllers, it is understood that the system 1500 can include robotic controllers, numeric controllers, smart devices, network devices, and the like. The programmable logic controllers 1502-1506 are associated with a plurality of data stores 1508-1512, wherein data from such controllers 1502-1506 can be provided to the data stores 1508-1512. While the system 1500 illustrates a one-to-one relationship between the programmable logic controllers 1502-1506 and the data stores 1508-1512, it can be discerned that various arrangements between programmable logic controllers and data stores are possible, and all such possibilities are contemplated and intended to fall under the scope of the hereto-appended claims. For example, the programmable logic controller 1502 can provide data to a plurality of data stores. Similarly, the data store 1508 can receive data from a plurality of programmable logic controllers. The plurality of data stores 1508-1512 can be accessed by a monitoring component 1514, which facilitates aggregating the data and then generating tracking and tracing parameters 1516 based upon the aggregation. For example, the aggregation can include analyzing metadata and correlating particular data objects.

Figure 16:
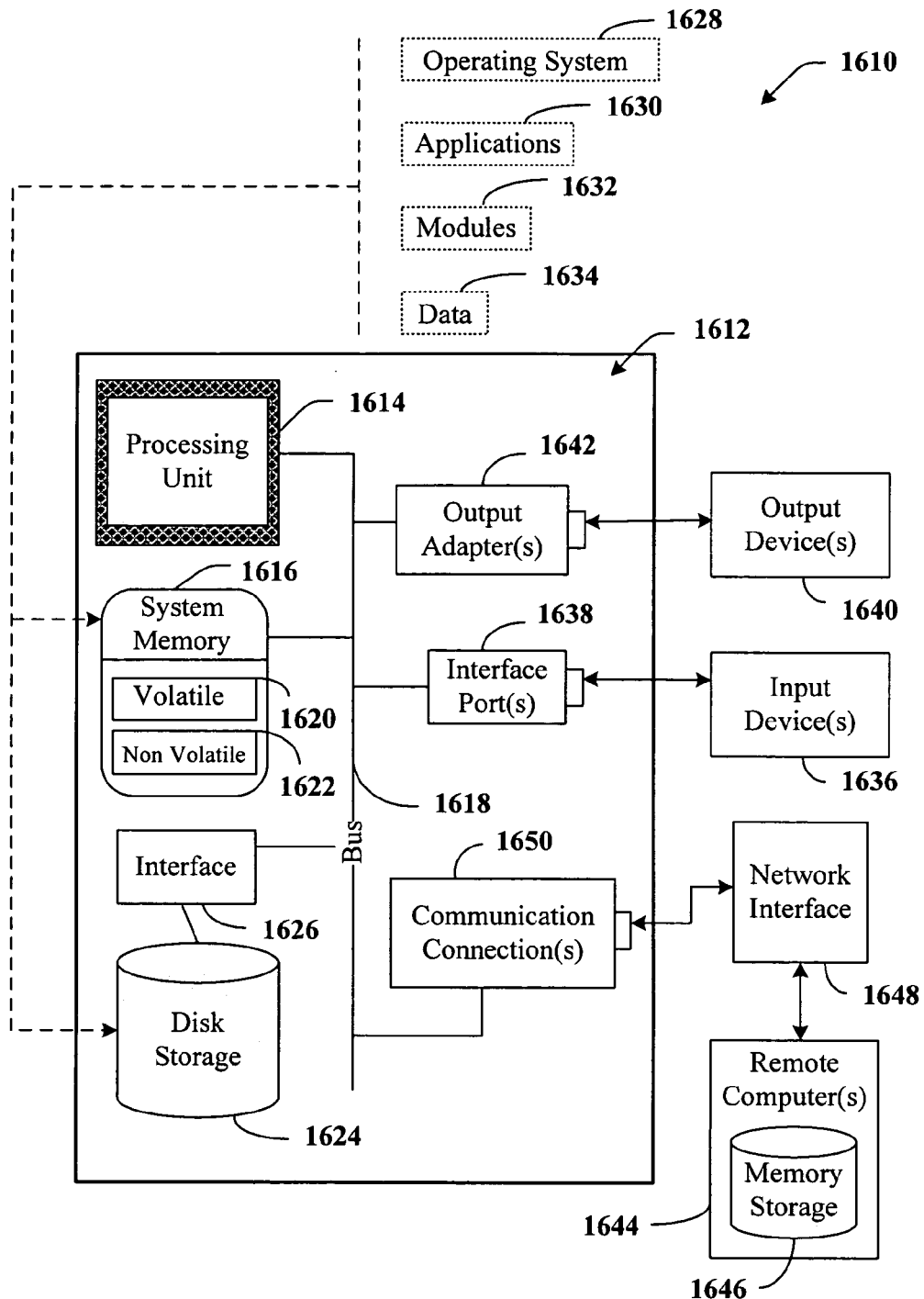
FIG. 16 is an example operating system upon which various features described herein can be implemented.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). The above reference to a networked environment, however, is not intended to exclude an embedded computing platform as a host for any suitable functionality described herein.

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
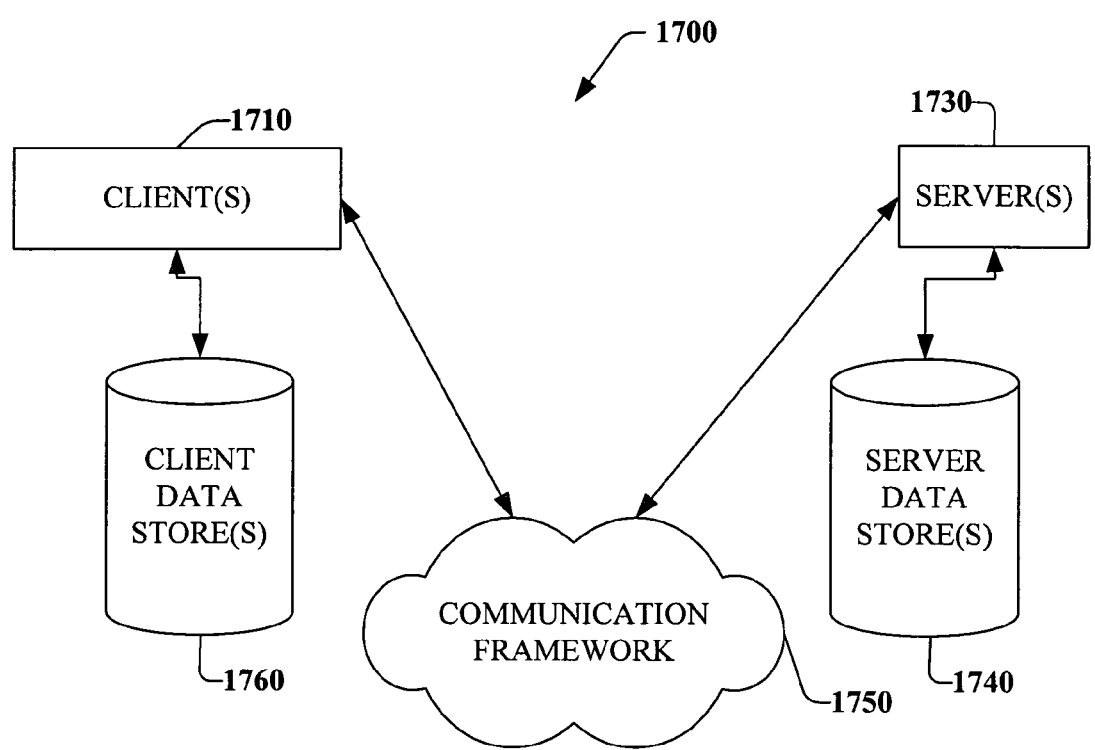
FIG. 17 is an exemplary computing environment within which various features described herein can interact.

FIG. 17 is a schematic block diagram of a sample-computing environment 1700 with which the subject invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the subject invention, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates tracking and tracing products in an industrial environment comprising:
  a processor configured to support the operation of coputer-executable compnents stored on a computer-readable storage medium, the computer-executable components including:
  a reception component that receives data indicative of location of entities within an industrial environment, the data converted to a standardized form consistent with a hierarchically structured data model which integrates equipment hierarchy with procedure hierarchies such that data objects corresponding to the received data are associates with metadata inidicating types of process associates therewtih;
  a monitoring componnt that outputs tracking and tracing parameters of the entities across process boundaries, wherein tracking parameters include real-time reckoning of a location for the entities and tracing parametners include retrospective reckoning of occurance of events for the entities; and
  a view generation component that provides a view indicating current tracking and tracing parameters.

2. The system of claim 1, the boundaries comprise boundaries between batch, continuous, discrete, or inventory processes.

3. The system of claim 1, the received data is generated by one or more programmable logic controllers.

4. The system of claim 1, further comprising an appending component that appends metadata to the received data, wherein the view created is dependent upon the metadata.

5. The system of claim 1, further comprising a genealogy component that facilitates creation of genealogy records across process boundaries over time.

6. The system of claim 1, further comprising a proxy component that facilitates utilization of data from a legacy programmable logic controller in connection with the tracking and tracing of the entities.

7. The system of claim 6, the proxy component comprises a mapping component that maps data from a flat data structure to data that conforms to the hierarchically structured data model.

8. The system of claim 6, the proxy component comprises a bridging component that converts data that conforms to a first network protocol to data that conforms to a second network protocol.

9. The system of claim 8, the second network protocol is Common Industrial protocol(CIP).

10. The system of claim 1, further comprising a security component that ensures that an operator is authorized to review tracking and tracing data prior to providing the operator with such data.

11. The system of claim 1, further comprising a filtering component that filters data relating to tracking and tracing of the entities based at least in part upon user identity.

12. The system of claim 1, the hierarchically structured data model is based at least in part upon one or more of: ISA S88, ISA S95, or OMAC.

13. The system of claim 1, further comprising an interface component that facilitates provision of tracking and tracing data to a remote client.

14. The system of claim 13, the provision of the tracking and tracing data is accomplished by way of one of the Internet or an intranet.

15. The system of claim 1, further comprising a view generation component that creates a view of at least a portion of a factory as well as positions of the entities within the factory.

16. A method for tracking and tracing a product across process boundaries comprising:
  receiving data relating to a product from multiple controllers of an industrial control environment as implemented with the support of a processor operatively coupled to memory, the controllers control related processes, conversion of the data to a standardized form consistent with a hierarchically structured data model which integrates equipment hierarchy with procedure hierarchy suct that data objects are associated with metadata indicating a type of process associated therewith;
  utilizing the data to output tracking and tracing parameter data of the product across process boundaries for one or more procedures with which the porduct is associated, wherein tracking paramenter data includes real-time reckoning of a location for the product and tracing parameter data includes tetrospective reckoning of occurrence of events for the product; and
  generating a high-level view of the industrial control environment and overlaying the high-level view with current tracking and tracing parameter data..

17. The method of claim 16, further comprising generating a view that illustrates tracking and tracing parameters in terminology particular to an operator.

18. The method of claim 16, further comprising ensuring that an operator is authorized to receive tracking and tracing data prior to providing the operator with such data.

19. The method of claim 16, further comprising mapping data from at least one of the multiple controllers that does not support the hierarchically structured data model to data that conforms to the hierarchically structured data model.

20. The method of claim 16, further comprising converting data from at least one of the multiple controllers from data that conforms to a first network protocol to data that conforms to a second network protocol.

21. The method of claim 20, the second network protocol is Common Industrial Protocol(CIP).

22. The method of claim 16, at least a portion of the data is obtained by way of Radio-frequency identification(RFID) tags on entities associated with the product.

23. The method of claim 16, further comprising providing access to the tracking and tracing data to a remote entity by way of one or more of the Internet or an intranet.

24. The method of claim 16, wherein the high-level view is a representation of an industrial plant and includes boundaries between at least two of the following: a batch process, a transportation process, a packaging process, or a storage process.

25. A system that facilitates performing tracking and tracing across process boundaries within an industrial automation environment, comprising:
  a processor operatively coupled to memory configured to:
  receive data relating to multiple processes within the industrial automation environment, the received data is converted to a standardized form consistent with a hierarchically structured data model that integrates equipment hierarchy with procedure hierarchy such that data objects are associated with metadata indicating types of processes associated therewith;
  convert data that does not conform to hierarchically structured data model to data that conforms to the hierarchically sturectured data model;
  analyze the received data to generate tracking and tracing data across process boundaries, wherein tracking data includes real-time location data and tracing data includes retrospective occurrence of events; and
  create an overlaid view of current tracking and tracing data over the multiple processes of industrial automation environment from the received data.

26. The system of claim 25, the view further comprising a view of at least a portion of a factory illustrating tracking and tracing data.

* * * * *